United States Patent [19]
Tsunefuji

[11] 4,392,729
[45] Jul. 12, 1983

[54] MOVABLE REFLECTING MIRROR FOR SINGLE LENS REFLEX CAMERA

[75] Inventor: Katsuhiko Tsunefuji, Hachioji, Japan

[73] Assignee: Olympus Optical Company Ltd., Japan

[21] Appl. No.: 312,826

[22] Filed: Oct. 19, 1981

[30] Foreign Application Priority Data

Nov. 18, 1980 [JP] Japan .............................. 55-165833[U]

[51] Int. Cl.$^3$ ........................ G03B 19/12; G02B 27/14
[52] U.S. Cl. ..................................... 354/152; 354/224; 350/172
[58] Field of Search ............. 354/22, 23 R, 59, 53–56, 354/152, 155, 219, 224, 225, 42, 49; 350/172, 276 R, 276 SL

[56] References Cited
U.S. PATENT DOCUMENTS 1,451,774  4/1923  Holbrook et al. ................... 350/172
3,668,406  6/1972  Reid et al. ....................... 350/172 X
3,872,484  3/1975  Hashimoto et al. ............... 354/56 X

FOREIGN PATENT DOCUMENTS 53-119030 10/1978 Japan .

*Primary Examiner*—William B. Perkey
*Attorney, Agent, or Firm*—Ostrolenk, Faber, Gerb & Soffen

[57] ABSTRACT

A movable reflecting mirror for single lens reflex camera is adapted to permit photometry by utilizing part of the light from an object being photographed which has been transmitted through the reflecting mirror. A transmitting area is formed in part of the reflector of the mirror in a manner such that light incident on the reflecting mirror in the region of the transmitting area and reflected by the rear surface of the reflecting mirror is reflected again by the rear surface of the reflector.

8 Claims, 4 Drawing Figures

MOVABLE REFLECTING MIRROR FOR SINGLE LENS REFLEX CAMERA

BACKGROUND OF THE INVENTION

The invention relates to a movable reflecting mirror for use in a single lens reflex camera, and more particularly, to a movable reflecting mirror having an area which permits part of light from an object being photographed to be transmitted therethrough.

As is well recognized, a movable reflecting mirror which is used in a single lens reflex camera is provided with a transmitting area through which part of light from an object being photographed passes for reflection by an auxiliary total reflection mirror to be incident on a light receiving element which is provided for purpose of photometry or distance measurement. An example of such construction is illustrated in FIG. 1. Specifically, referring to FIG. 1, a movable reflecting mirror 1 is centrally formed with a transmitting area 1a which is defined by a half mirror. An auxiliary total reflection mirror 2 is disposed on the rear side of the transmitting area 1a and is arranged to be angularly movable. The angular movement of the auxiliary mirror 2 is interlocked with a movement of the movable reflecting mirror 1. Thus, before a shutter release, the movable reflecting mirror 1 is in its down position where it forms an angle of 45° within the path of picture-taking light, and the auxiliary mirror 2 is positioned rearwardly of the movable reflecting mirror 1 substantially at right angles thereto. Light from an object being photographed which passes through a picture-taking lens 3 is reflected in the upward direction by the movable reflecting mirror to be introduced into finder optics including a focussing glass 4, pentaprism 5 and eyepiece 6.

On the other hand, the remaining portion of the light from the object being photographed is transmitted through the transmitting area 1a, which is centrally formed in the movable reflecting mirror 1 by a half mirror, for total reflection by the auxiliary mirror 2 to be incident, through a condenser lens 9, on a photometric, light receiving element 10 which is disposed below and outside the path of picture-taking light at a position which is conjugate to the focussing glass 4 and the surface of a film 8. As the movable reflecting mirror 1 is angularly driven upward toward the focussing glass 4 in response to a shutter release operation, the auxiliary mirror 2 also angularly moves in the same direction or in the upward direction so as to close the transmitting area 1a, and both the movable reflecting mirror 1 and the auxiliary mirror 2 come to a rest at their horizontal positions 1A, 2A located outside the path of picture-taking light and which are shown by dash-dot lines where they overlap each other in a horizontal position, thus intercepting any reverse incidence of light from the eyepiece 6 into the path of picture-taking light. Under this condition, light from the object being photographed which passes through the taking lens 3 is focussed onto the film 8 to form a picture thereon. Reference character 1b in FIG. 1 represents a reflector area which is formed by a non-transmitting, reflecting film of known material.

The movable reflecting mirror 1 having the transmitting area 1a defined by a half mirror as mentioned above suffers from the disadvantage that in the region of the transmitting area 1a, light which is transmitted through the transmitting region 1a and is reflected by the rear surface 1c of the mirror becomes superimposed on the light which is reflected toward the finder optics by the front surface of the mirror, thereby producing a ghost or double image in the sight of the finder optics, making it difficult to recognize the image.

The generation of the ghost will be more specifically considered with reference to FIG. 2. In this Figure, S1 represents a central ray of light from an object being photographed which travels through the transmitting area 1a of the movable reflecting mirror 1 to be directed toward the center of the image field of the film 8, and S2 an oblique ray of the light from an object being photographed which passes through the lower end of the transmitting area 1a to be directed toward the center of the image field of the film 8. Representing the refractive index and the thickness of the movable reflecting mirror 1 by $\gamma$ and t, respectively, the central ray S1 will intersects with the surface of the movable reflecting mirror 1 with an angle of $\theta_0$ (45°), and a major proportion of such light will be reflected upwardly, at right angles to the incident ray, to produce a ray S1a while part thereof will impinge upon transmitting area 1a with an angle $\theta_1$ which is defined by the relationship $\sin(90° - \theta_0) = \gamma \sin \theta_1$ or $\cos \theta_0 = \gamma \sin \theta_1$. Most of such light will transmit through the transmitting area 1a toward the auxiliary mirror 2 (see FIG. 1), but a fraction thereof is reflected by the rear surface 1c of the transmitting area 1a and thence by the front surface thereof to produce a reflected ray S1b which extends in parallel relationship with the reflected ray S1a for incidence upon the finder optics. This causes a ghost image. As will be evident from the drawing, the spacing $l_1$ between the both rays S1a and S1b as measured on the front surface of the movable reflecting mirror 1 is given as follows:

$$l_1 = 2t \cdot \tan\theta_1 = 2t \cdot \tan\left\{\sin^{-1}\left(\frac{\cos\theta_0}{\gamma}\right)\right\}$$

On the other hand, the oblique ray S2 intersects with the front surface of the movable reflecting mirror 1 with an angle $\theta_0'$ ($\theta_0' < \theta_0 = 45°$), and a substantial portion thereof is reflected upwardly to produce a ray S2a while the remainder impinges upon the transmitting area 1a with an angle $\theta_2$ defined by the relationship $\sin(90° - \theta_0') = \gamma \sin \theta_2$ or $\cos \theta_0' = \gamma \sin \theta_2$, in the same manner as described above in connection with the central ray S1. A substantial proportion of such impinging ray will transmit through the transmitting area 1a toward the auxiliary mirror 2, but a fraction thereof is reflected by the rear surface 1c and then directed by the front surface of the transmitting area 1a to produce a reflected ray S2b which extends parallel to the ray S2a for incidence upon the finder optics, thus causing a ghost. The spacing $l_2$ between the reflected rays S2a, S2b as measured on the surface of the movable reflecting mirror 2 is given as follows:

$$l_2 = 2t \cdot \tan\theta_2 = 2t \cdot \tan\left\{\sin^{-1}\left(\frac{\cos\theta_0'}{\gamma}\right)\right\}$$

Since the inequality $\theta_0' < \theta_0 = 45°$ applies, it follows that $\theta_2 > \theta_1$, and hence $l_2 = 2t \cdot \tan \theta_2 > l_1 = 2t \cdot \tan \theta_1$.

A movable reflecting mirror of the prior art which is provided with a transmitting area defined by a half mirror suffers from a serious disadvantage of producing a ghost as mentioned above. A variety of proposals have been made to solve this problem. By way of example, Japanese Laid-Open Patent Application No. 119,030/1978 discloses a reflecting mirror assembly in which a transmitting area is defined by a group of totally transmitting, fine pinholes formed therein. While this approach is effective to substantially eliminate the occurrence of ghost, it causes a diffraction of rays which transmit through the pinholes toward an auxiliary mirror. Consequently, while this arrangement presents no problem whatsoever when it is used for photometry, it cannot be used for a measurement of the distance as utilized in an auto-focus arrangement where a sharp image must be formed on a light receiving element. In addition, the formation of the pinholes is a complex and troublesome procedure, resulting in an increased cost. A movable reflecting mirror is also already known having a transmitting area in the form of slits having a certain width so as to avoid the diffraction phenomenon. However, a degree of size is required, which again causes the reflection of light from the rear surface of the transmitting area, making the occurrence of ghost unavoidable.

SUMMARY OF THE INVENTION

In view of the foregoing, it is an object of the invention to provide a practical movable reflecting mirror for a single lens reflex camera which eliminates all of the described disadvantages through a sophisticated configuration and arrangement of a transmitting area.

In accordance with the invention, the transmitting area has a size and dimension, preventing the occurrence of diffracting phenomenon. Light from an object being photographed can be caused to form a sharp image on a light receiving element which is used for purpose of distance measurement, and thus it may be used for auto-focus application without any trouble. Since the reflection of light from the rear surface of the reflecting mirror in the region of the transmitting area is completely eliminated, no ghost or double image is formed, eliminating the difficulty which has been experienced in the prior art in recognizing an image in the finder.

DESCRIPTION OF PREFERRED EMBODIMENT

Figure 1:
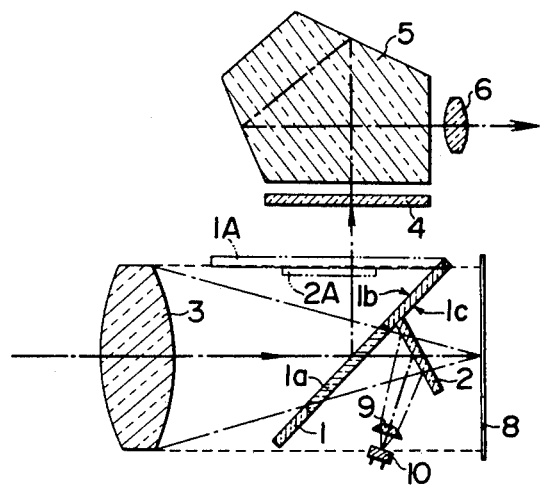
FIG. 1 is a schematic cross section of one form of movable reflecting mirror used in a single lens reflex camera of the prior art.
Figure 3:
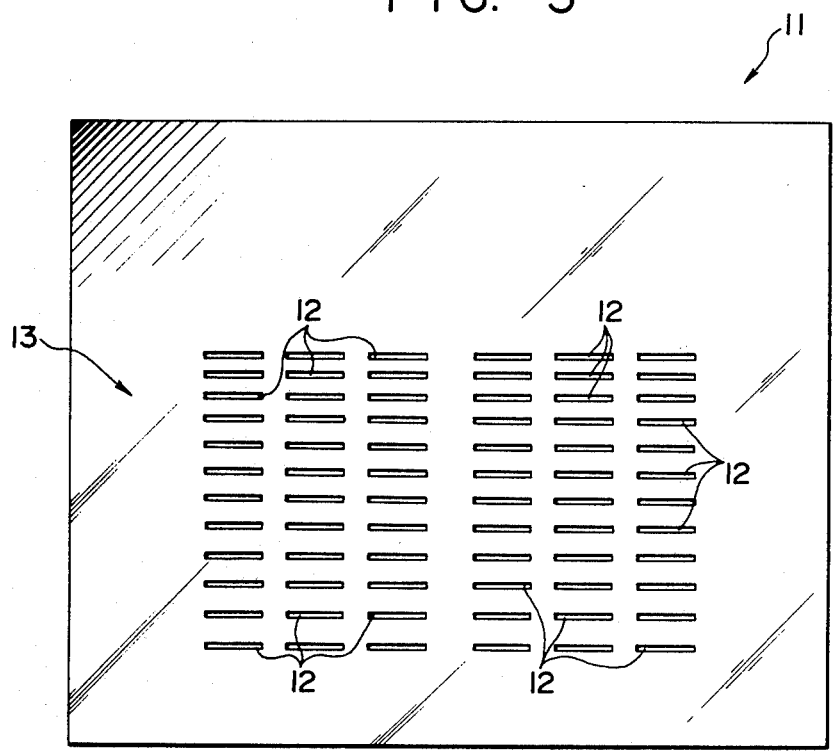
FIG. 3 is a front view of a movable reflecting mirror according to one embodiment of the invention.

Referring to FIG. 3, a movable reflecting mirror 11 for a single lens reflex camera which is constructed according to one embodiment of the invention is shown in front view. The mirror 11 is disposed inside a single lens reflex camera, not shown, in a manner similar to that of the movable reflecting mirror 1 shown in FIG. 1. As shown, the surface of the movable reflecting mirror 11 is provided with a coating or the like which defines a reflector 13 having formed therein a number of totally transmitting areas 12 formed by horizontally elongate slits or notches which are disposed in a matrix form covering from a central to a lower region thereof.

Figure 2:
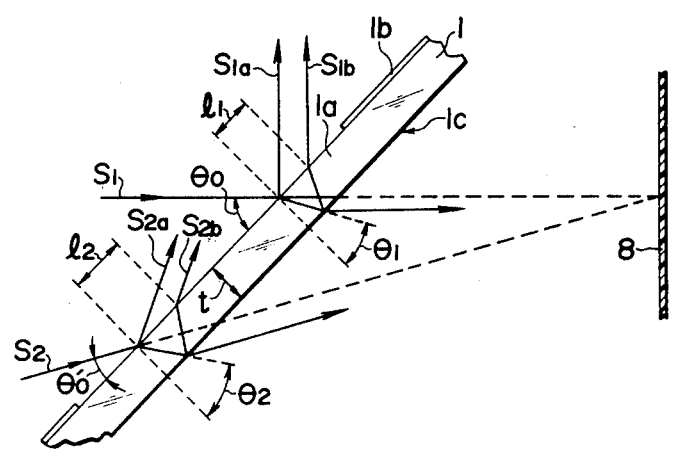
FIG. 2 is an enlarged cross section of the reflecting mirror shown in FIG. 1.
Figure 4:
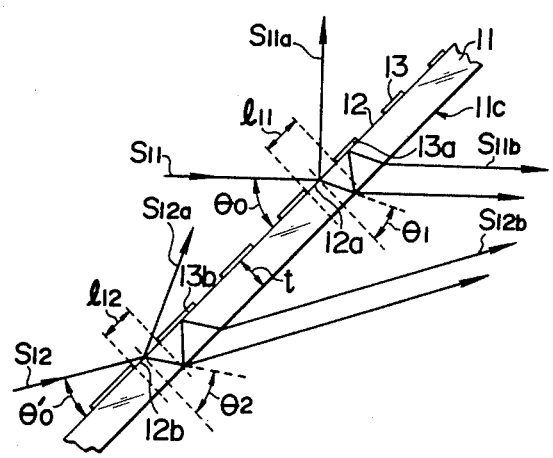
FIG. 4 is a fragmentary enlarged cross section of the mirror shown in FIG. 3.

Referring to FIG. 4, the width of and the spacing between the transmitting areas 12 will be more specifically discussed. FIG. 4 shows an essential part of the movable reflecting mirror 11 which is disposed at an angle of 45° within the path of picture-taking light in the similar manner as the movable reflecting mirror 1 of FIG. 1. Rays S11, S12 of light from an object being photographed which impinge upon the movable reflecting mirror 11 intersect the mirror 11 at angles of $\theta_0$, $\theta_0'$, respectively, generally in the similar manner as the rays S1, S2 shown in FIG. 2, and are directed toward the center of the image field of a film 8 (see FIG. 2). Representing the thickness and the refractive index of the reflecting mirror by t and $\gamma$, respectively, the widths $l_{11}$, $l_{12}$ of the transmitting areas 12a, 12b which are located in correspondence to the rays S11, S12 can be chosen to satisfy the following inequalities:

$$l_{11} < 2t \cdot \tan\theta_1 = 2t \cdot \tan\left\{\sin^{-1}\left(\frac{\cos\theta_0}{\gamma}\right)\right\} =$$

$$2t \cdot \tan\left\{\sin^{-1}\left(\frac{\cos 45°}{\gamma}\right)\right\}$$

$$l_{12} < 2t \cdot \tan\theta_2 = 2t \cdot \tan\left\{\sin^{-1}\left(\frac{\cos\theta_0'}{\gamma}\right)\right\}$$

When chosing such widths for transmitting areas 12a, 12b, the rays S11a, S12a which are reflected by the front surface of the respective transmitting areas 12a, 12b will be directed toward the focussing glass 4 while the rays S11b, S12b which transmit through the areas 12a, 12 b and are reflected by the rear surface 11c of the mirror 11 will be again reflected by the rear surface of the reflector segments 13a, 13b whilch are located immediately above the corresponding transmitting areas 12a, 12b, and directed, as shown, toward a rearwardly located auxiliary mirror, not shown. The widths $l_{11}$, $l_{12}$ of the transmitting areas 12a, 12b are very narrow, and are 0.5 mm at most or less. Thus, their widths are less than the widths of the reflector segments 13a, 13b. As a result, the rays S11b, S12b which are reflected by the rear surface 11c of the mirror 11 are entirely reflected again by the rear surface of the reflector segments 13a, 13b, and cannot pass to the front side of the mirror 11, completely eliminating the occurrence of a double image.

As will be seen from the drawings, the angle $\theta_0$ or $\theta_0'$ with which the ray S11a or S12a incident on the transmitting areas such as the transmitting areas 12a, 12b intersects the movable reflecting mirror 11 gradually decreases as the ray impinges on a lower point on the mirror. Hence, the spacing, as measured on the surface of the reflecting mirror 11, between the incident rays to the areas 12a, 12b and the reflected rays which are reflected by the rear surface of the reflector segments 13a, 13b, which can be represented as $2t \cdot \tan\theta_1$, $2t \cdot \tan\theta_2$ or the like, will increase as the rays are incident on a lower part of the mirror. Accordingly, the width of a reflector segment which is located immediately above a particular transmitting area must progressively increase as the associated transmitting area is located in the lower part of the mirror. An example of an arrangement for the transmitting areas 12 which satisfies such requirement is illustrated in FIG. 3.

In the example shown, the movable reflecting mirror 11 has a thickness t of 0.8 mm and refractive index of 1.51. Individual transmitting areas 12 have an equal width of 0.3 mm, and these areas 12 are disposed in a matrix form comprising six columns and twelve rows. The spacing between adjacent rows are chosen to be 1.5, 1.4, 1.4, 1.4, 1.35, 1.25, 1.25, 1.15, 1.15, 1.15, 1.05 and 1.00 mm, respectively, beginning from the lowermost pair of rows. With the movable reflecting mirror 11 having transmitting areas 12 thus arranged, about 6% of the light from an object being photographed can be effectively directed onto an auxiliary mirror 2 (see FIG. 1) without causing diffracting phenomenon. Since the majority of reflected light impinges upon the focussing glass 4, there occurs no reduction in the brightness of the image formed in the finder. In addition, no double image is formed, avoiding any difficulty experienced in the prior art in recognizing the image within the finder. Consequently, the light receiving element 10 can be effectively used for purpose of distance measurement to provide an auto-focus function as well as for photometry.

It should be understood that the configuration and arrangement of transmitting areas formed in the movable reflecting mirror of the invention is not limited to those illustrated in the embodiment, the only requirement being that the light which is reflected by the rear surface of the reflecting mirror after passing through a transmitting area or areas thereof be reflected again by the rear surface of a reflector segment or segments of the reflecting mirror. Accordingly, any appropriate configuration and arrangement of transmitting areas can be utilized.

What is claimed is:

1. A camera comprising:
   (A) picture-taking optics including a lens for transmitting picture-taking light along and around a first optical axis which is the lens axis and onto a film plane of said camera;
   (B) viewfinder optics; and
   (C) a mirror movable between a first position wherein said mirror is at an angle with respect to said first optical axis, intercepts picture-taking light transmitted by said picture-taking optics before it reaches said film plane and reflects said picture-taking light toward said viewfinder optics and a second position wherein said mirror is removed from said first optical axis and permits said picture-taking light to reach said film plane, said mirror including:
   (1) an optically transmissive member having a front surface and a rear surface which are partially reflective;
   (2) reflecting means disposed on said front surface of said member for reflecting substantially all of the picture-taking light incident thereon; and
   (3) light transmitting openings formed in said reflecting means, the size and spacing of said light transmitting openings being selected such that picture-taking light, which is generally concentrated around the first optical axis by the picture-taking optics, but which also is dispersed around the first optical axis, is transmitted through said openings and some of the transmitted light is reflected by said rear surface of said member while none of that reflected light refracts through said front surface of said member toward said viewfinder optics and the size of the openings is also selected so that diffracting phenomena are avoided.

2. The camera according to claim 1, in which the transmitting openings formed in said reflecting means comprise a number of horizontally elongated slits disposed in a matrix and the slits are considerably horizontally more elongated than their width in the vertical direction.

3. The camera according to claim 2, in which said slits have width which is equal to or less than 0.5 mm.

4. The single lens reflex camera according to claim 2 in which the vertical spacing between adjacent slits increases toward the lower end of the movable reflecting mirror while the widths of the slits remain the same.

5. The camera according to any of claim 1, 2, 3 or 4 in which said optically transmissive member is planar, has a thickness t and a refractive index $\gamma$, said angle of said mirror with respect to said picture-taking light at a given point where said mirror intercepts said picture-taking light is $\theta_0$, the width of each of said light transmitting openings is l as measured in the vicinity of said given point, the relationship $$l < 2t \cdot \tan\left(\sin^{-1}\frac{(\cos\theta_0)}{\gamma}\right)$$

being satisfied at any said given point.

6. The camera according to claim 1, in which the reflecting means comprises a reflective coating located on the front surface of said optically transmissive member.

7. The camera according to claim 1, in which the reflecting means has a light reflective rear surface, the picture-taking light reflected from said rear surface of said optically transmissive member being further reflected from said reflective rear surface of said reflecting means.

8. The camera according to claim 1, in which the size, shape and spacing of said light transmitting openings are such that light transmitted through said openings and through the rear surface of said optically transmissive member does not undergo diffraction.

* * * * *